J. A. AND K. M. BALACTAR.
AUTOMOBILE ENGINE HOOD COVER.
APPLICATION FILED JULY 6, 1921.
1,424,192.
Patented Aug. 1, 1922.
2 SHEETS—SHEET 1.
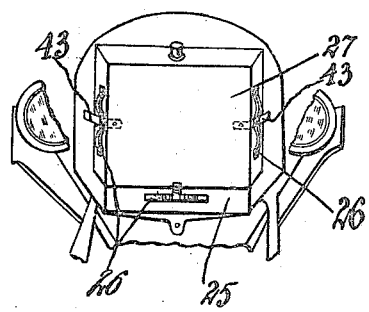
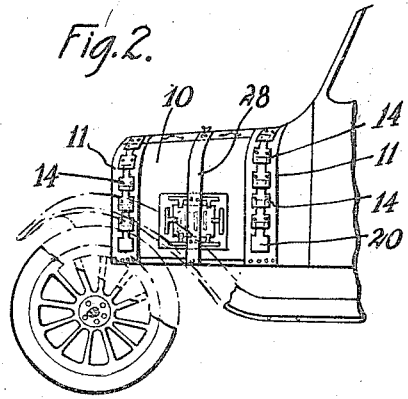
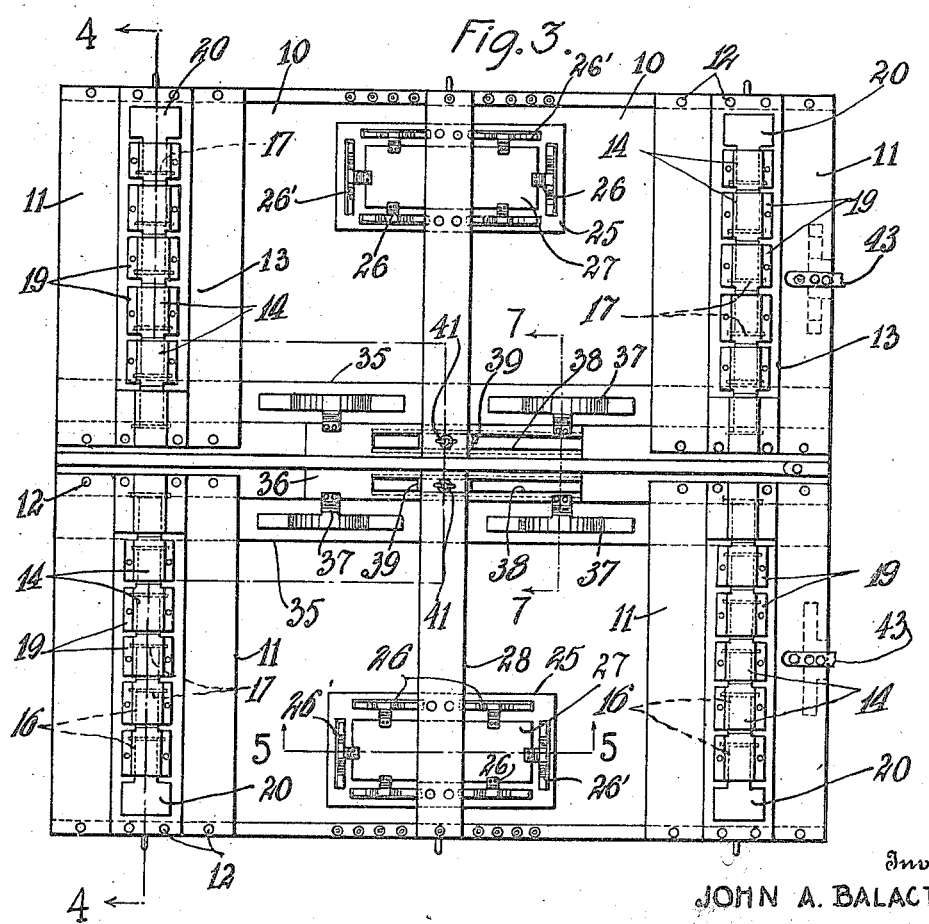
Inventors
JOHN A. BALACTAR
KIRIL M. BALACTAR

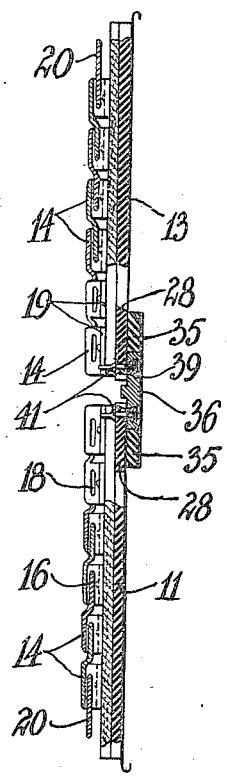
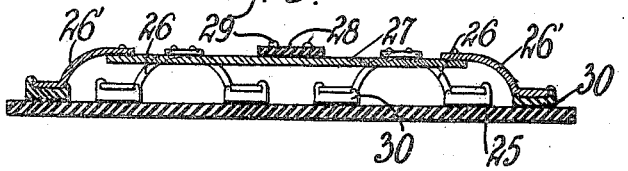
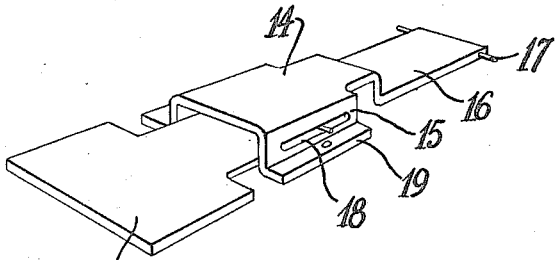
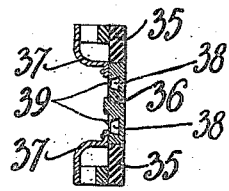

UNITED STATES PATENT OFFICE.

JOHN A. BALACTAR AND KIRIL M. BALACTAR, OF FORD CITY, CANADA.

AUTOMOBILE ENGINE-HOOD COVER.

1,424,192.  Specification of Letters Patent.  Patented Aug. 1, 1922.

Application filed July 6, 1921. Serial No. 482,691.

*To all whom it may concern:*

Be it known that we, JOHN A. BALACTAR and KIRIL M. BALACTAR, citizens of Roumania, residing at Ford City, Province of Ontario, Canada, have invented certain new and useful Improvements in Automobile Engine-Hood Covers, of which the following is a specification.

This invention relates to a protective covering for automobile engine hoods and radiators, and it has for an object to provide a novel and efficient covering means for such hoods and radiators which can be used when the automobile is standing idle during inclement weather or when the automobile is being washed, to prevent access of water to the engine or its accessories.

For further comprehension of the invention, and of the objects and advantages thereof, reference will be had to the following description and accompanying drawings, and to the appended claims in which the various novel features of the invention are more particularly set forth.

Fig. 1 of the drawings is a fragmentary front view of an automobile, illustrating particularly the application of the invention to the radiator.

Fig. 2 is a fragmentary side view showing the application of the invention to the engine hood.

Fig. 3 is a projecting plan view of the hood with the protective devices applied thereto.

Fig. 4 is a transverse section on the line 4—4 of Fig. 3.

Fig. 5 is a detail horizontal section on the line 5—5 of Fig. 3.

Fig. 6 is a fragmentary perspective view of the chain member carried by the joint straps.

Fig. 7 is a detail transverse section on the line 7—7 of Fig. 3.

In automobile engine hoods as ordinarily constructed rain or water can have ready access at the side edges of the hinged hood members, while during washing of the automobile water may enter through the usual air vents provided in such side members.

To cover the joints at the sides of the hinged hood members, indicated at 10, we provide the straps 11 of rubber which are adapted to be secured at opposite ends by the usual buttons 12, to the hood. Upon the outer faces of these straps are placed the smaller facing strips 13 which are preferably of a tougher rubber material or composition and are adapted to have riveted thereto chain members which are illustrated in detail in Fig. 6 and comprise channel shaped link members 14, having flanges 15 and a longitudinal extension 16 vertically offset, this extension 16 of each link projecting between the flanges 15 of adjacent links and having pins 17 projecting therefrom and engaging in longitudinal slots 18 in the flanges 15, which latter are formed with base elements 19 adapted to receive the rivets whereby they are secured to the straps 13. The end link of the chain structure just described is in the form of a tab 20 which may readily be grasped by the handle when the strap is being stretched over the hood. There are preferably a pair of these straps for each half of the hood, as clearly shown in Fig. 3.

To cover the air vents in the sides of the hood we provide a pair of rubber pads 25 of sufficient size to cover said openings. To press these rubber pads against the hood they have each engaged therewith the flat springs 26 which arch outwardly therefrom and are secured at opposite ends to a metal plate 27 which is thus held resiliently spaced from the pad 25. Straps 28 of rubber or leather are extended across these plates 27, being preferably buttoned or riveted thereto as at 29 and secured at their ends to suitable elements on the engine hood. The springs 26 are shown as having laterally extended feet 26' which engage with strips or projections 30 on the pad 25.

Along the top edges of the hinged hood members we provide a pair of rubber strips 35 between which is a metal plate 36 having spring elements 37 fixed thereto and pressing downwardly on the strips 35. The plate 36 has a pair of dove-tail grooves 38 extending inward from one end thereof in which are engaged guide blocks 39 having screws fixed thereto and projecting through suitable apertures in the upper ends of the straps 28 whereby the latter are held in place, wing nut 41 being screwed down upon the strap ends.

To cover the radiator we provide a device constructed as shown in Fig. 5 and shaped according to the radiator face. This device is secured in place by means of straps 43 which take over the edges thereof and the front edges of the hood and may be secured in place by suitable button or snap fasteners.

As will be apparent, with our improved protective device, access of water to the interior of the engine hood is prevented while at the same time circulation of air in the hood is practically prevented, thus preventing the engine from cooling quickly when left idle.

Having thus described our invention what we claim as new and desire to protect by Letters Patent of the United States is as follows:

1. A covering for a vent in the engine hood of an automobile comprising a flexible water-proof member engaging over said vent, a metal element spaced outwardly from said member, bow spring elements connected to said metal element and bearing on said member, and a strap engaging said metal element to press the same toward the said member.

2. A covering for an air vent in the engine hood of an automobile comprising a rubber pad, a metal plate spaced apart from said pad, spring elements connected to said plate and bearing on said pad, and a strap adapted to press said plate toward said pad.

3. A covering for an air vent in the engine hood of an automobile comprising a rubber pad, a metal plate spaced apart from said pad, spring elements connected to said plate and bearing on said pad, said spring elements having laterally extending feet engaging the pad, and a strap adapted to press said plate toward said pad.

In testimony whereof we have affixed our signatures.

JOHN A. BALACTAR.
KIRIL M. BALACTAR.